US012106888B2

(12) United States Patent
Iwata et al.

(10) Patent No.: US 12,106,888 B2
(45) Date of Patent: Oct. 1, 2024

(54) COIL DEVICE

(71) Applicants: TDK CORPORATION, Tokyo (JP); TDK KOREA CORPORATION, Gyeonggi-Do (KR)

(72) Inventors: Hiroyuki Iwata, Tokyo (JP); Kiyofumi Fujiwara, Tokyo (JP); Sepung Ki, Gyeonggi-Do (KR); Chihu An, Gyeonggi-Do (KR)

(73) Assignees: TDK CORPORATION, Tokyo (JP); TDK KOREA CORPORATION, Pyeongtaek-si (KR)

( * ) Notice: Subject to any disclaimer, the term of this patent is extended or adjusted under 35 U.S.C. 154(b) by 864 days.

(21) Appl. No.: 17/144,383

(22) Filed: Jan. 8, 2021

(65) Prior Publication Data

US 2021/0225580 A1 Jul. 22, 2021

(30) Foreign Application Priority Data

Jan. 16, 2020 (JP) ................................ 2020-005299

(51) Int. Cl.

*H01F 17/04* (2006.01)
*H01F 27/24* (2006.01)
*H01F 27/28* (2006.01)
*H01F 27/29* (2006.01)

(52) U.S. Cl.

CPC ............ *H01F 27/29* (2013.01); *H01F 27/24* (2013.01); *H01F 27/2823* (2013.01)

(58) Field of Classification Search

CPC ...................................................... H01F 27/29
USPC ........................................................ 336/221
See application file for complete search history.

(56) References Cited

U.S. PATENT DOCUMENTS

2018/0158597 A1* 6/2018 Chiu .................... H01F 27/306

FOREIGN PATENT DOCUMENTS

| | | | |
|---|---|---|---|
| CN | 104465034 | A | 3/2015 |
| JP | H0533506 | U | 4/1993 |
| JP | H07-272951 | A | 10/1995 |
| JP | H08-31644 | A | 2/1996 |
| JP | H08-64433 | A | 3/1996 |
| JP | 2015-133418 | A | 7/2015 |

OTHER PUBLICATIONS

English translation JPH04364009 (Year: 1992).*
English translation JPH0864433 (Year: 1996).*
English translation JPH07272951 (Year: 1995).*
English translation of JPH0864433 (Year: 1996).*
JPH07272951 (Year: 1995).*

* cited by examiner

*Primary Examiner* — Ronald Hinson
(74) *Attorney, Agent, or Firm* — Oliff PLC

(57) ABSTRACT

A coil device including a magnetic core having a winding core around which a wire is wound to form a coil, and four terminal electrodes attached to an outer end surface of a flange formed at an end of the winding core along a winding axis. A recess is formed on the outer end surface of the flange, and each of the terminal electrodes includes a first rising piece loosely entering the recess, and a mounting piece integrally formed with the first rising piece and adhered to the outer end surface of the flange.

6 Claims, 12 Drawing Sheets

COIL DEVICE

BACKGROUND OF THE INVENTION

1. Field of the Invention

The invention relates to a coil device, and more particularly to a coil device in which two coil elements can be arranged in the same device and the bonding strength to such as a circuit board can be improved.

2. Description of the Related Art

The coil device disclosed in the below-described Patent Document 1 is a known example of a coil device capable of arranging two coil elements in the same device. According to the coil device of Patent Document 1, directly attached electrodes are formed on the outer end surface of the flange of the magnetic core by such as baking electrode paste, and the leads of the wires constituting the coil are connected to the directly attached electrodes to form a wire joint.

According to the coil device shown in Patent Document 1, the surface of the electrode on which the wire joint of the lead is formed serves as a mounting surface and is connected to such as a circuit board. In such conventional coil device, the bonding strength with such as the circuit board tends to be insufficient since the wire joint of the lead is located on the mounting surface.

The coil device disclosed in the below-described Patent Document 2 is also known. In this coil device, a recess is provided on an outer end surface of the core, and a bent piece of a terminal electrode is stored in the recess. And the terminal electrode and the core are bonded such as by injecting an adhesive into the recess and engaging the recess and the bent piece.

However, the conventional coil devices still have a problem that the bonding strength to a circuit board is not sufficient under a severe temperature environment, such as in-vehicle use.

[Patent Document 1] Japanese Unexamined Patent Application H08-31644

[Patent Document 2] Japanese Unexamined Patent Application H07-272951

SUMMARY OF THE INVENTION

The invention has been made in consideration of such situation. An object of the invention is to provide a coil device in which two coil elements can be arranged in the same device and the bonding strength to such as a circuit board can be improved.

To achieve the above object, a coil device according to the invention includes a magnetic core having a winding core around which a wire is wound to form a coil, and four terminal electrodes attached to an outer end surface of a flange formed at an end of the winding core along a winding axis, in which a recess is formed on the outer end surface of the flange, and each of the terminal electrodes includes a first rising piece loosely entering the recess, and a mounting piece integrally formed with the first rising piece and adhered to the outer end surface of the flange.

According to the coil device of the invention, four terminal electrodes are attached to the outer end surface of the flange of the magnetic core. Thus, according to the coil device of the invention, at least two wires can be wound around the winding core of the magnetic core, and each lead at both ends of each wire can be connected to each of the four terminal electrodes. Therefore, it is possible to arrange the two coil elements in the same device according to the coil device of the invention.

Further, in the coil device of the invention, a recess is formed on the outer end surface of the flange of the magnetic core, and the first rising piece of each terminal electrode loosely enters the recess. Therefore, when the coil device of the invention is mounted on a circuit board or the like, a connecting member such as solder enters inside of the recess, and a fillet is formed on the outer surface of the first rising piece. Thus, bonding strength between a circuit board and terminal electrodes is improved.

The terminal electrode is composed of a metal terminal or the like, and the mounting piece, the main part, is adhered to the outer end surface of the flange. Moreover, the first rising piece of each terminal electrode only loosely enters the recess, and the wall surface of the recess and the first rising piece are not engaged. Therefore, even when the coil device is exposed to an environment with severe temperature changes such as from −40 to 150° C., a thermal stress acting on the terminal electrodes is unlikely to act on the flange of the magnetic core. And there is little risk of causing cracks and the like in the magnetic core. Further, the joint strength between the coil device and the circuit board is less deteriorated even in a severe temperature environment.

Preferably, the second rising piece is integrally formed on an edge of the mounting piece located on the opposite side of the first rising piece. The second rising piece is integrally raised along a first side surface substantially perpendicular to a first axis of the flange.

Fillets of connecting members such as solder are likely to be formed on the outer surface of the second rising piece. Therefore, the bonding strength between the terminal electrode and the circuit board or the like is further improved.

Preferably, the first rising piece is arranged offset compared to the second rising piece, and is located near a center axis of the winding core, when viewed from a direction of the first axis. By arranging the first rising piece as described above, the recess, formed on the outer end surface of the flange of the magnetic core, can be arranged closer to the center side of the outer end surface. As a result, the position of the recess formed corresponds to the position of the winding core of the magnetic core. And even if the recess is formed on the flange, there is less risk of reducing the strength of the magnetic core, and the recesses can be formed without increasing the thickness of the flange, which contributes to the compactness of the coil device.

Preferably, a third rising piece, different from the first rising piece, is integrally formed on the mounting piece, the third rising piece is integrally raised along a second side surface substantially perpendicular to a second axis of the flange, and a lead of the wire is connected to the third rising piece.

With this configuration, each terminal electrode has three rising pieces, which will be raised at different positions from the mounting piece to the side surface or into the recess of the flange. As the number of the connection fillet with the circuit board increases, the connection strength with the circuit board is further improved Preferably, the flange protrudes outward in a radial direction of the winding core, and has a substantially quadrangular shape when viewed from a direction of the winding axis, and each of the four corners of the flange has a cutout, in which a connection between the third rising piece and the lead is arranged. With this configuration, the volume of the magnetic core can be maintained to the maximum and the decrease in inductance can be suppressed without changing the outer diameter of the flange, while maintaining miniaturization of the coil device.

Preferably, an adhesive for adhering the mounting piece to the outer end surface of the flange is prevented from entering the recess. That is, it is preferable that the terminal electrode is adhered to the outer end surface of the flange only via the mounting piece. With this configuration, even if the coil device is exposed to an environment with severe temperature changes, the thermal stress acting on the terminal electrodes is unlikely to act on the flange of the magnetic core, which is less likely to cause cracks in the magnetic core. Further, there is little deterioration in the bond strength between the coil device and the circuit board, even in a severe temperature environment.

Preferably, a gap is formed with a predetermined clearance between a side wall of a bottom wall of the recess and a tip of the first rising piece that enters the recess. With this configuration, even if the coil device is exposed to an environment with severe temperature changes, the thermal stress acting on the terminal electrodes is unlikely to act on the flange of the magnetic core, which is less likely to cause cracks in the magnetic core. Further, there is little deterioration in the bond strength between the coil device and the circuit board, even in a severe temperature environment.

Preferably, the recess comprises four independent recesses formed on the outer end surface of the flange, and each of the first rising pieces of the terminal electrodes is inserted into each of the independent recesses. The recess on the outer end surface of the flange is formed with four independent recesses, therefore, the strength of the magnetic core is less likely to decrease, and the coil device can be easily made compact. Further, with this configuration, it is easy to secure insulation between the terminal electrodes.

DESCRIPTION OF THE EMBODIMENTS

Figure 1A:
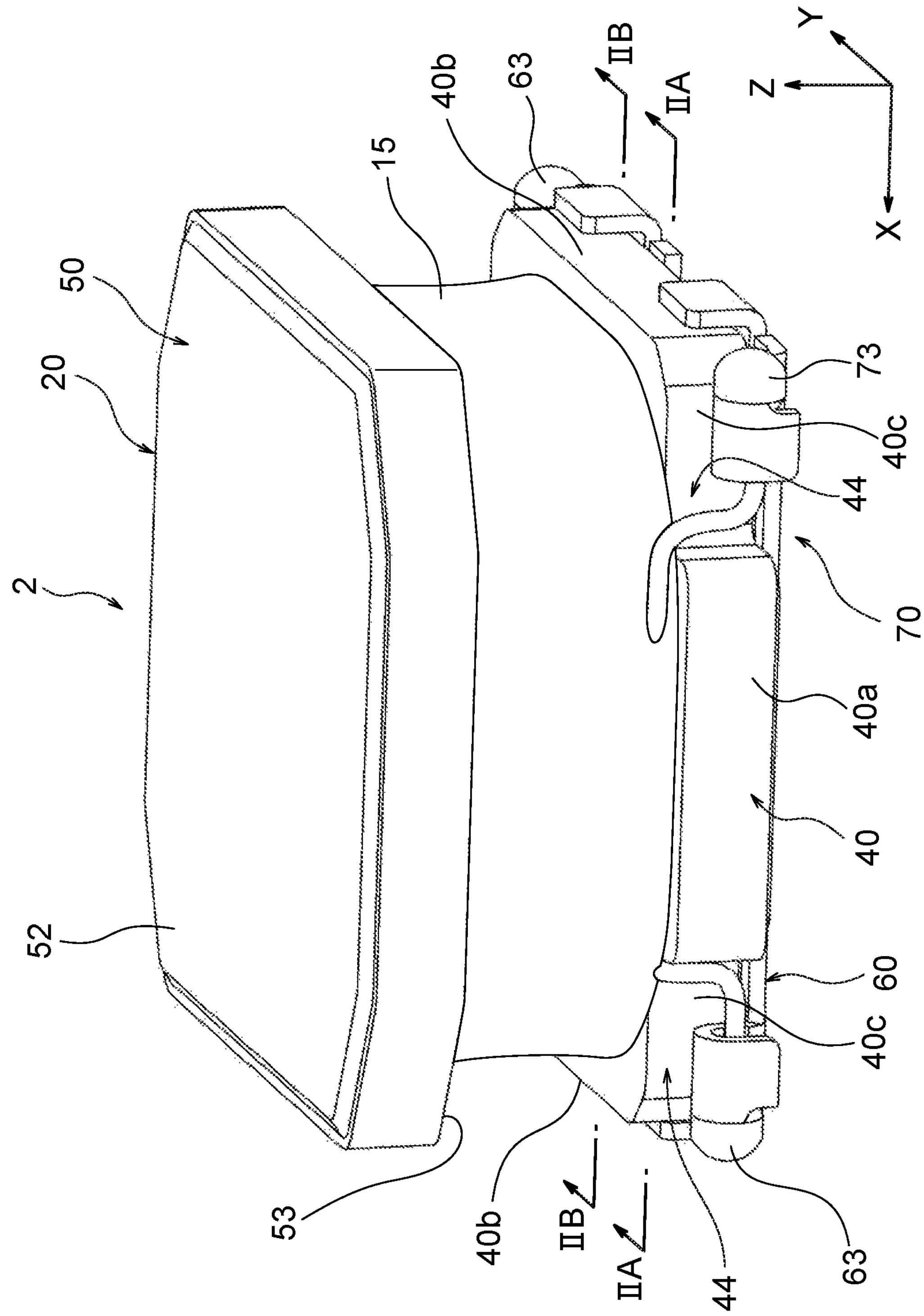
FIG. 1A is a perspective view of the coil device according to an embodiment of the invention.

Hereinafter, the invention will be described based on the embodiments shown in the drawings. The coil device 2 according to an embodiment of the invention shown in FIGS. 1A to 1E is an inductor device used such as a choke coil, a noise filter, and particularly preferably used in-vehicle, and has two coil elements in the same device 2.

Figure 2A:
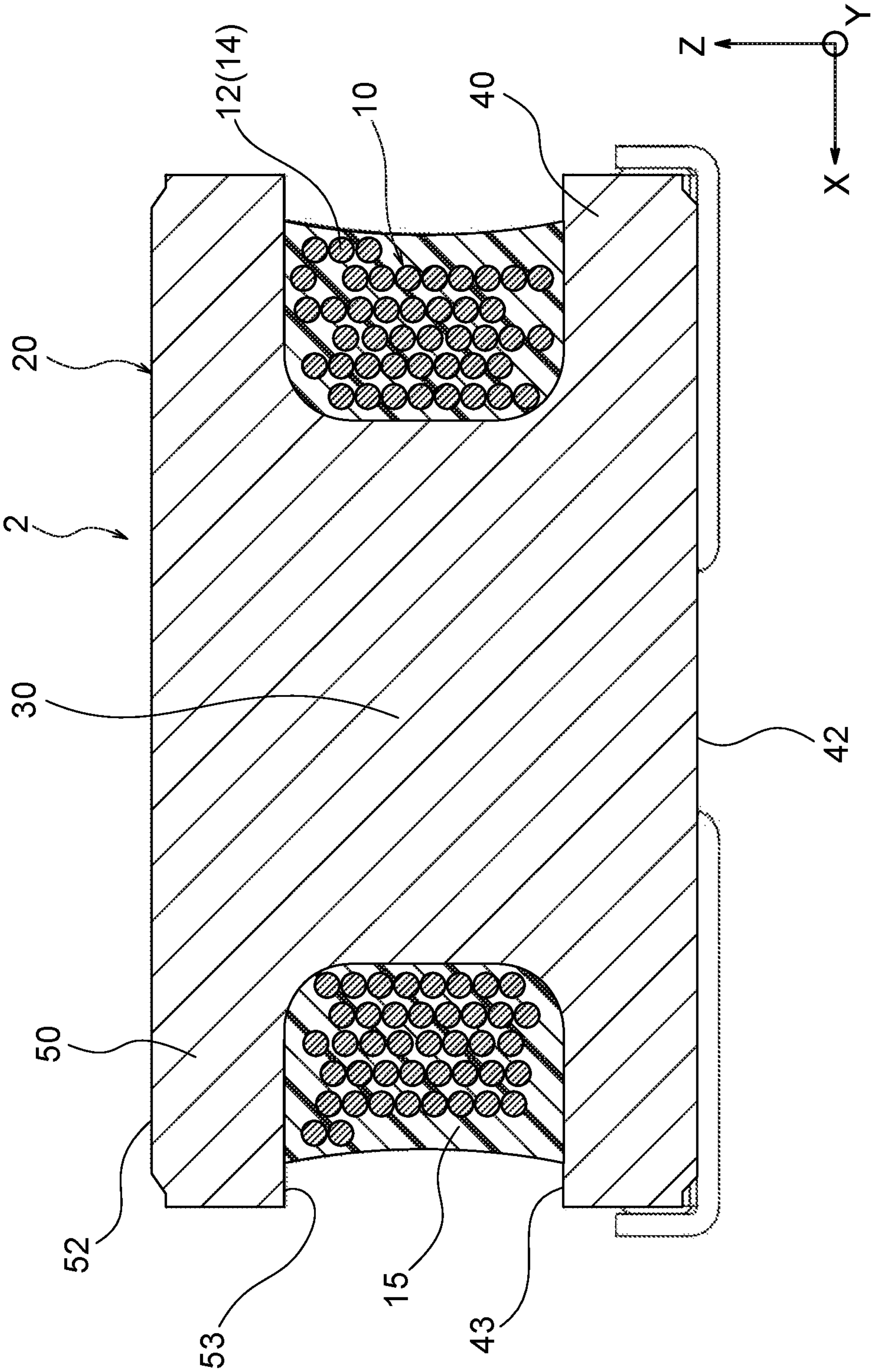
FIG. 2A is a schematic cross-sectional view along line IIA-IIA of the coil device shown in FIG. 1A.

As shown in FIG. 2A, the coil device 2 has a drum core 20 as a magnetic core. Examples of the magnetic material constituting the drum core 20 include soft magnetic materials such as metal and ferrite, however, the magnetic material is not particularly limited. The drum core 20 has a winding core 30 around which two wires 12 and 14 constituting the coil 10 are wound along a winding axis direction of the core 20.

It is preferable that the periphery of the winding core 30 around which the wires 12 and 14 are wound is covered with an exterior resin 15. By covering with the exterior resin 15, the coil 10 can be effectively protected and short-circuit defects can be suppressed. Further, the exterior resin 15 is preferably made of a magnetic material containing resin. With this configuration, the exterior resin 15 containing a magnetic material becomes a path for a magnetic field, and the magnetic properties of the coil device 2 are improved. The magnetic material contained in the exterior resin 15 is not particularly limited, and examples thereof include magnetic material powder similar to the magnetic material powder constituting the core 20, and the other magnetic material powder.

The wires 12 and 14 are not particularly limited, and examples thereof include a conductive core wire such as a flat wire, a round wire, a stranded wire, a litz wire, a braided wire, made of copper or the like, and conductive core wires thereof coated with insulation. In concrete, known winding wires such as AIW (polyimide wire), UEW (polyurethane wire), UEW, and USTC can be used. The wire diameter of the wire 12 is not particularly limited, and may be 0.1 to 0.5 mm. The wire diameters and materials of the two wires 12 and 14 may be the same or different.

A first flange 40 and a second flange 50 are integrally formed on both ends of the winding core 30 in the winding axis direction (the Z-axis direction), respectively. The first flange 40 and the second flange 50 project in the X-Y axis plane with respect to the winding core 30. An X-axis (the first axis), Y-axis (the second axis), and Z-axis (a third axis) are perpendicular to each other, and the Z-axis coincides with the axial direction of the winding axis.

The cross section (the cross section of the X-Y axis plane) of the winding core 30 is not limited to a particular shape, and may be a square cross section, a rectangular cross section, a circular cross section, or another cross section. The cross section has a substantially circular shape in the embodiment.

As shown in FIG. 2A, the second flange 50 has an outer end surface 52 in the winding axis direction (the Z-axis direction) and an inner surface 53 in the winding axis direction located on the opposite side of the outer end surface 52. The upper end of the coil 10 in the Z-axis direction is located on the inner surface 53. Further, the first flange 40 has an outer end surface 42 in the winding axis direction and an inner surface 43 in the winding axis direction located on the opposite side of the outer end surface 42. The lower end of the coil 10 in the Z-axis direction is located on the inner surface 43 in the winding axis direction. The number of winding layers of the wires 12 and 14 is not particularly limited, and the winding method of the wires 12 and 14 is also not particularly limited.

Figure 1B:
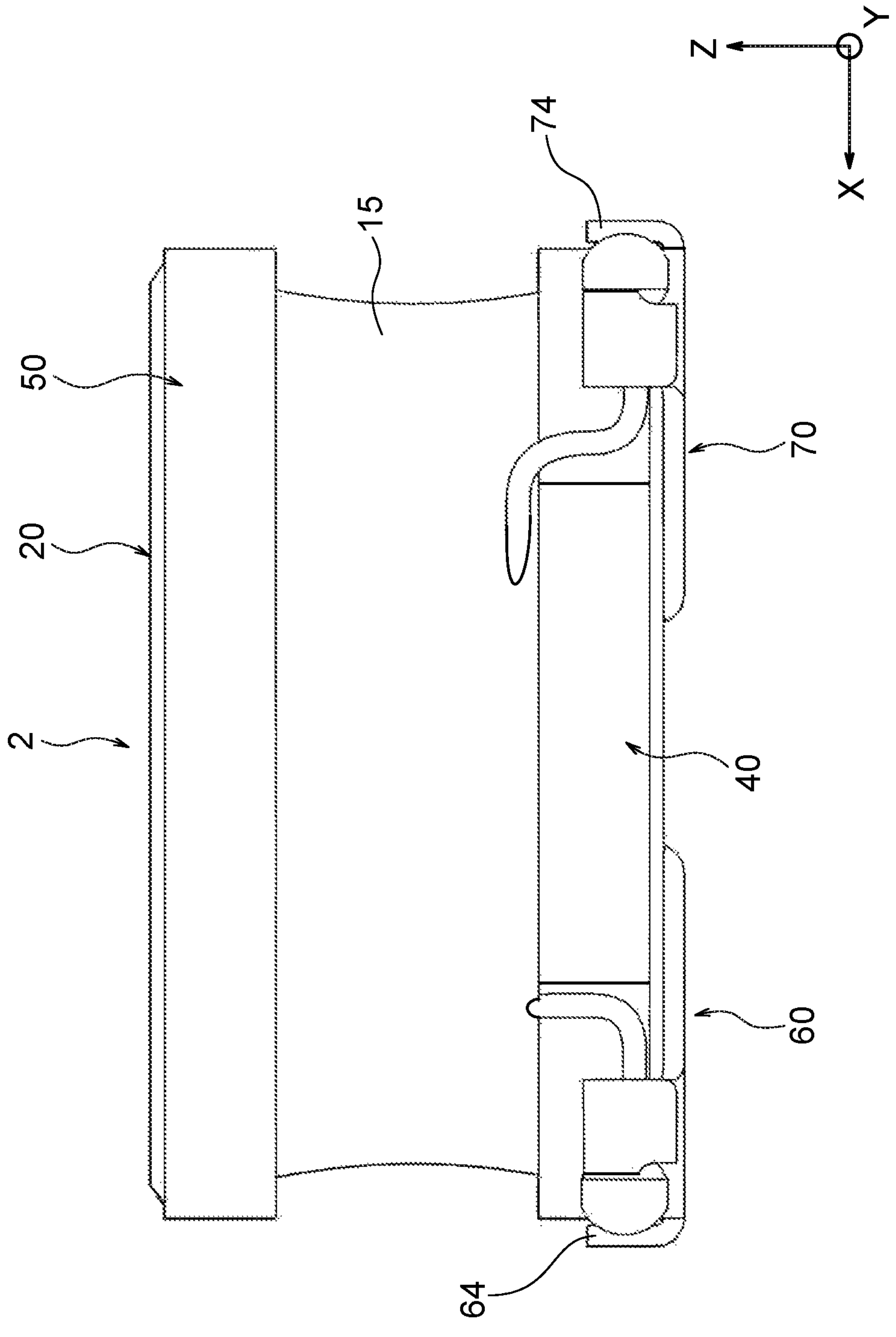
FIG. 1B is a front view of the coil device shown in FIG. 1A.
Figure 1C:
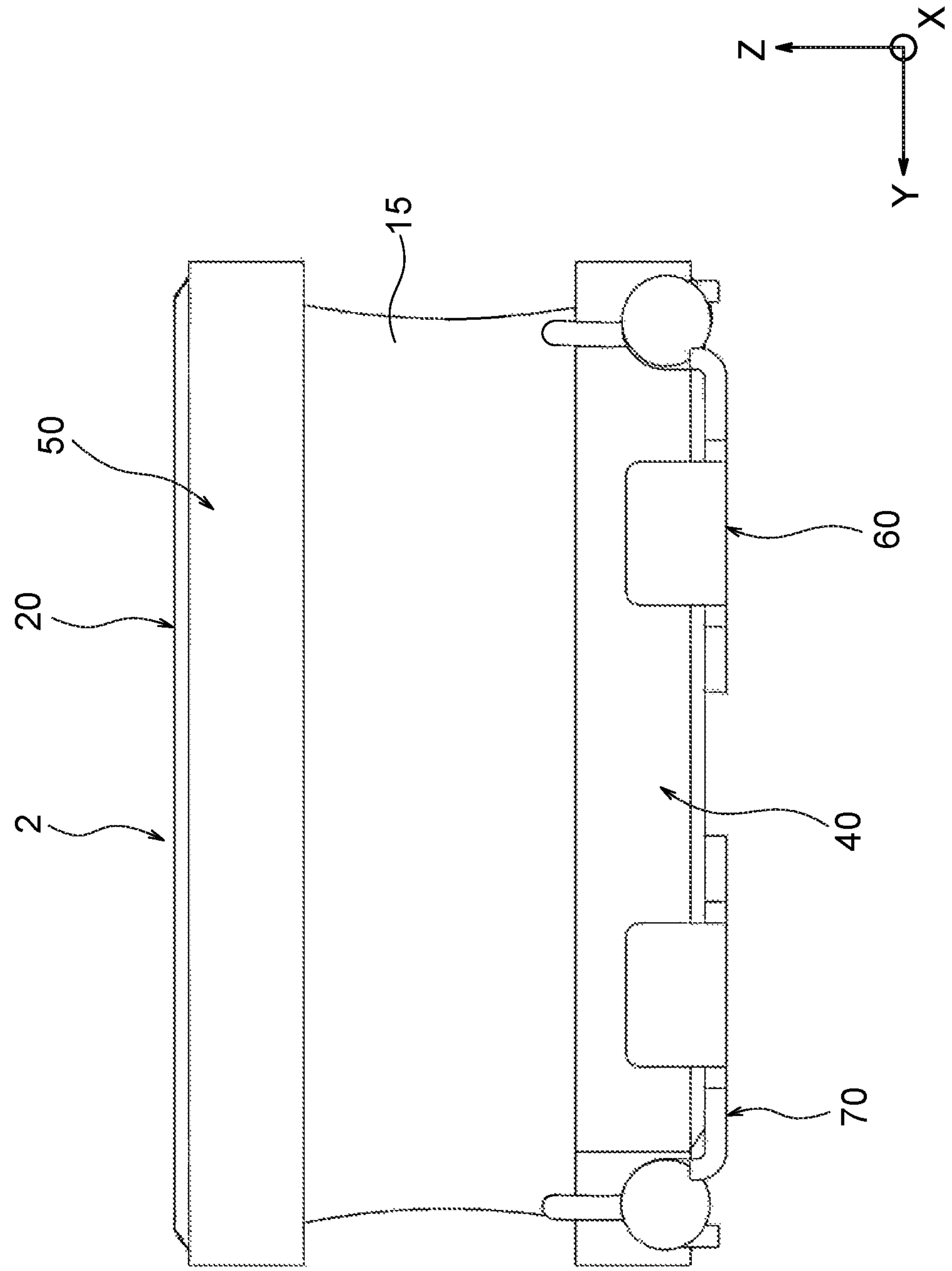
FIG. 1C is a right side view of the coil device shown in FIG. 1A (the left side view is symmetrical to the right side view).
Figure 1D:
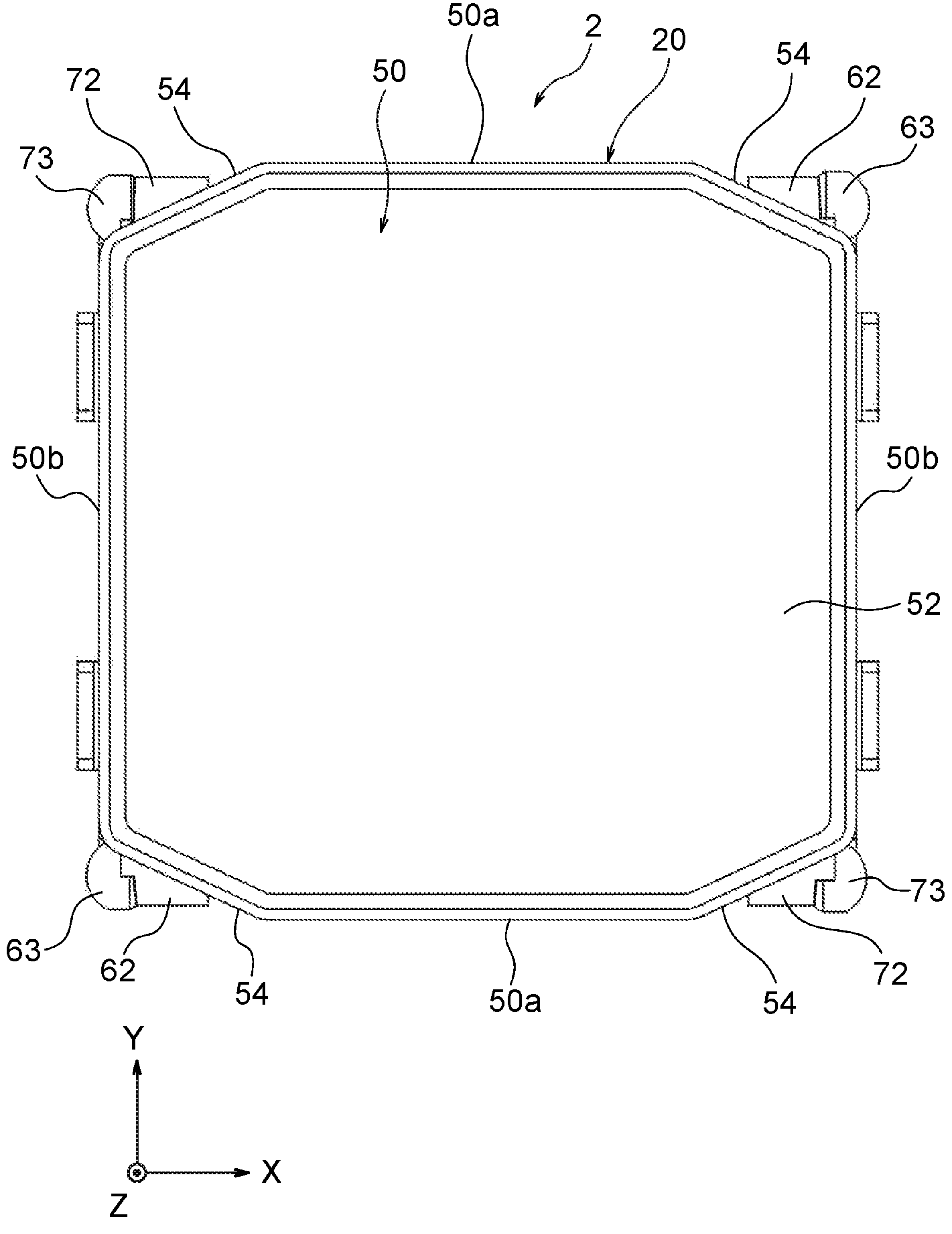
FIG. 1D is a plan view of the coil device shown in FIG. 1A.
Figure 3:
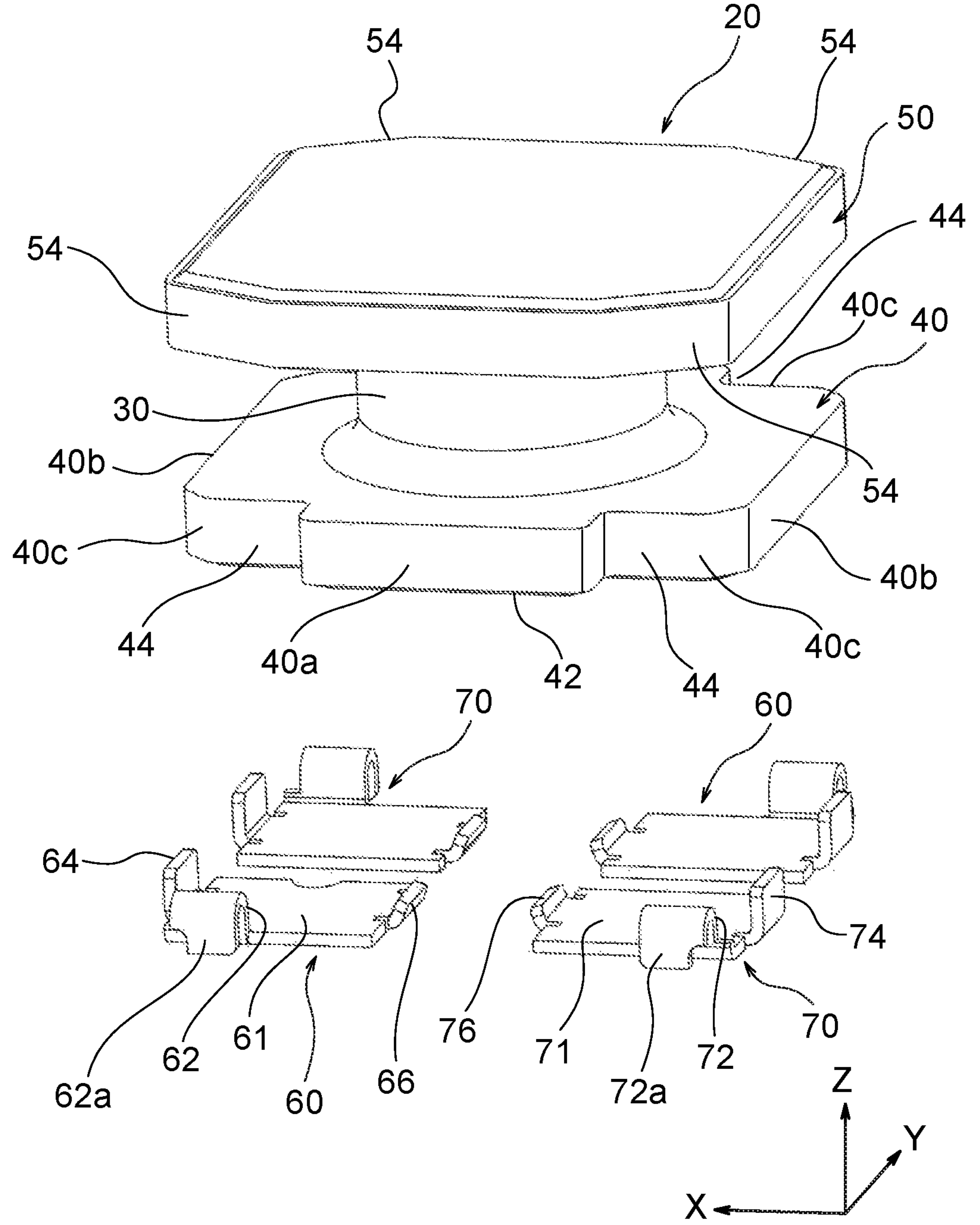
FIG. 3 is a perspective view showing the drum core and the terminal electrode shown in FIG. 1E in a disassembled manner.

The shape of the second flange 50 is not particularly limited, however, according to the embodiment, as shown in FIG. 1D, it has the side surfaces 50*a*, 50*a* opposing to each other in the Y-axis direction, and the side surfaces 50*b*, 50*b* opposing to each other in the X-axis direction, and shows a quadrangular shape when viewed from the Z-axis direction. Then, chamfers 54 are formed at each of the four corners, where the virtual extended surfaces on both sides of the side surfaces 50*a*, 50*a* of the second flange 50 and the virtual extended surfaces on both sides of the side surfaces 50*b*, 50*b* of the second flange 50 intersect, respectively. The chamfer 54 is integrally formed with the first flange 40, the second flange 50, and the winding core 30 when the drum core 20 shown in FIG. 3 is formed, however, the chamfer 54 may be formed by a cutting process or a polishing process after the integral forming.

Figure 5A:
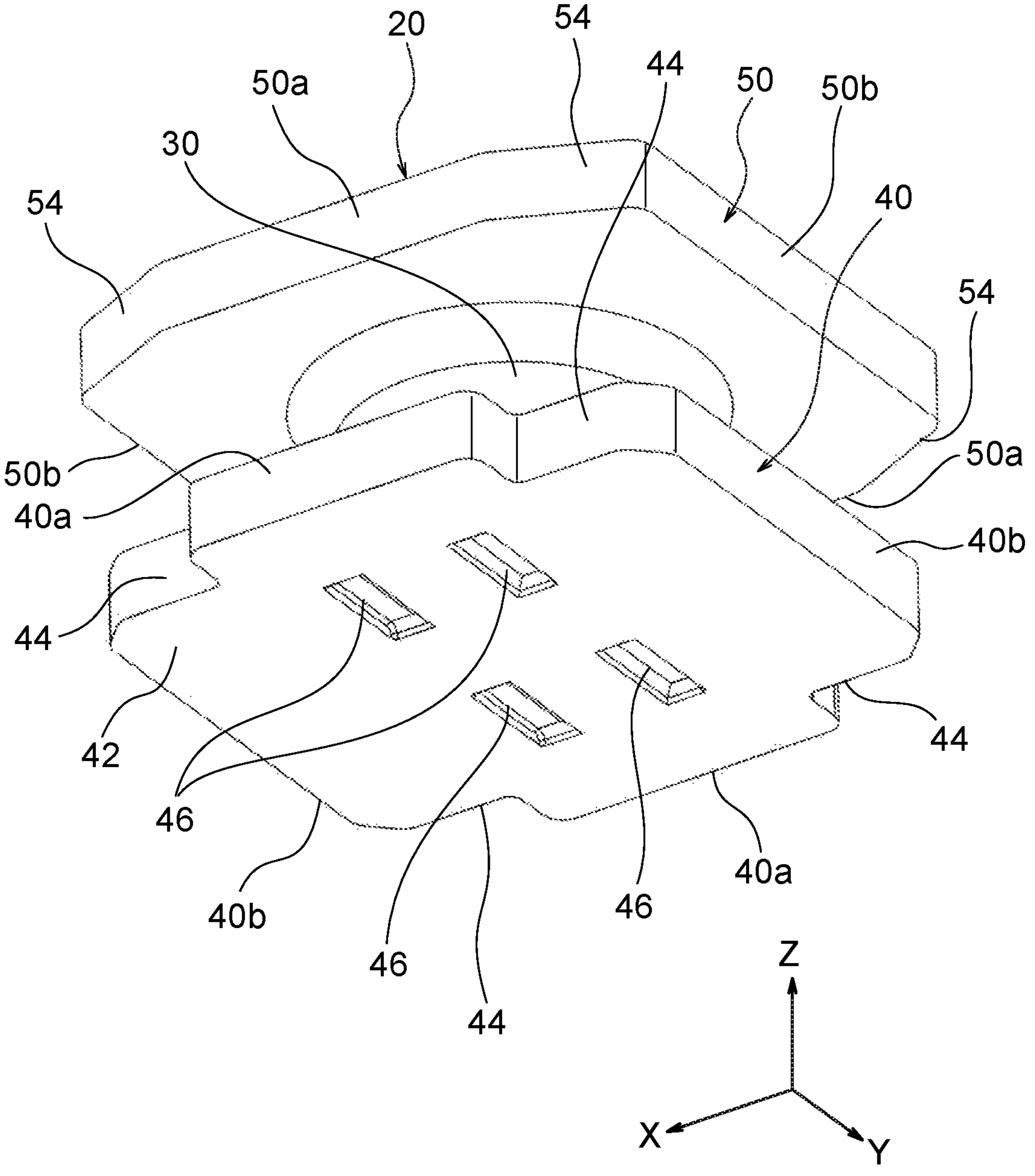
FIG. 5A is a perspective view of the drum core shown in FIG. 1E, viewed from the bottom surface side.

Further, the shape of the first flange 40 is also not particularly limited, however, according to the embodiment, as shown in FIG. 5A, it has the side surfaces 40*a*, 40*a* opposing to each other in the Y-axis direction, and the side surfaces 40*b*, 40*b* opposing to each other in the X-axis direction, and shows a quadrangular shape when viewed from the Z-axis direction. Then, cutouts 44 are formed at each of the four corners, where the virtual extended surfaces on both sides of the side surfaces 40*a*, 40*a* of the first flange 40 and the virtual extended surfaces on both sides of the side surfaces 40*b*, 40*b* of the first flange 40 intersect, respectively. The cutout 44 is integrally formed with the first flange 40, the second flange 50, and the winding core 30 when the drum core 20 is formed, however, the chamfer 54 may be formed by the cutting process or the polishing process after the integral forming.

According to the embodiment, as shown in FIG. 5A, the side surfaces 40*a*, 40*a* of the first flange 40 and the side surfaces 50*a*, 50*a* of the second flange 50, respectively, are located on the same virtual plane (the X-Z plane) to be substantially flush with each other. Further, the side surfaces 40*b*, 40*b* of the first flange 40 and the side surfaces 50*b*, 50*b* of the second flange, respectively are located on the same virtual plane (the Y-Z plane) to be substantially flush with each other.

Moreover, according to the embodiment, the size of each cutout 44 of the first flange 40 is larger than the size of each chamfer 54 of the second flange 50. As shown in FIG. 1D, when looking at the outer end surface 52 of the second flange 50 from the upper side in the Z-axis direction, the outer shape of the first flange 40 located below in the Z-axis direction is invisible. However, a part of the wire joints 63, 73 shown in FIG. 1A can be seen at a position corresponding to the chamfer 54 of the second flange 50

That is, according to the embodiment, the outer size of the second flange 50 and the same of the first flange 40 are almost the same, however, volumes thereof will be different for the same thickness, due to the presence of cutout 44 of the first flange 40, which is larger than the chamfer 54 of the second flange 50. To make the volume of the second flange 50 and the volume of the first flange 40 substantially the same, the Z-axis thickness of the first flange 40 may be made larger than the Z-axis thickness of the second flange 50.

As shown in FIG. 5A, four independent recesses 46 are provided on the outer end surface 42 of the first flange 40 at positions as close as possible to the center of the outer end surface 42. And two of the four independent recesses 46 are arranged at predetermined clearances in the X-axis direction, while the other two of the four independent recesses 46 are arranged at predetermined clearances in the Y-axis direction. Each independent recess 46 is formed long along the Y-axis direction. The distance between the independent recesses 46 adjacent to each other along the X-axis or the Y-axis is determined to ensure the insulation between the terminal electrodes 60, 70, adjacent to each other along the X-axis or the Y-axis shown in FIG. 3

According to the embodiment, as shown in FIG. 3, a pair of terminal electrodes 60 and a pair of terminal electrodes 70, a total of four terminal electrodes 60, 70 are attached on the outer end surface 42 of the first flange 40 in the winding axis direction. The terminal electrode 60 and the terminal electrode 70 have a mirror-symmetrical shape (shape as mirror image to one another) with respect to the plane including the Y-axis and the Z axis. Although details of the terminal electrodes will be described later, they are composed of conductive metal plates such as tough pitch steel, phosphor bronze, brass, iron, nickel, etc.

Figure 1E:
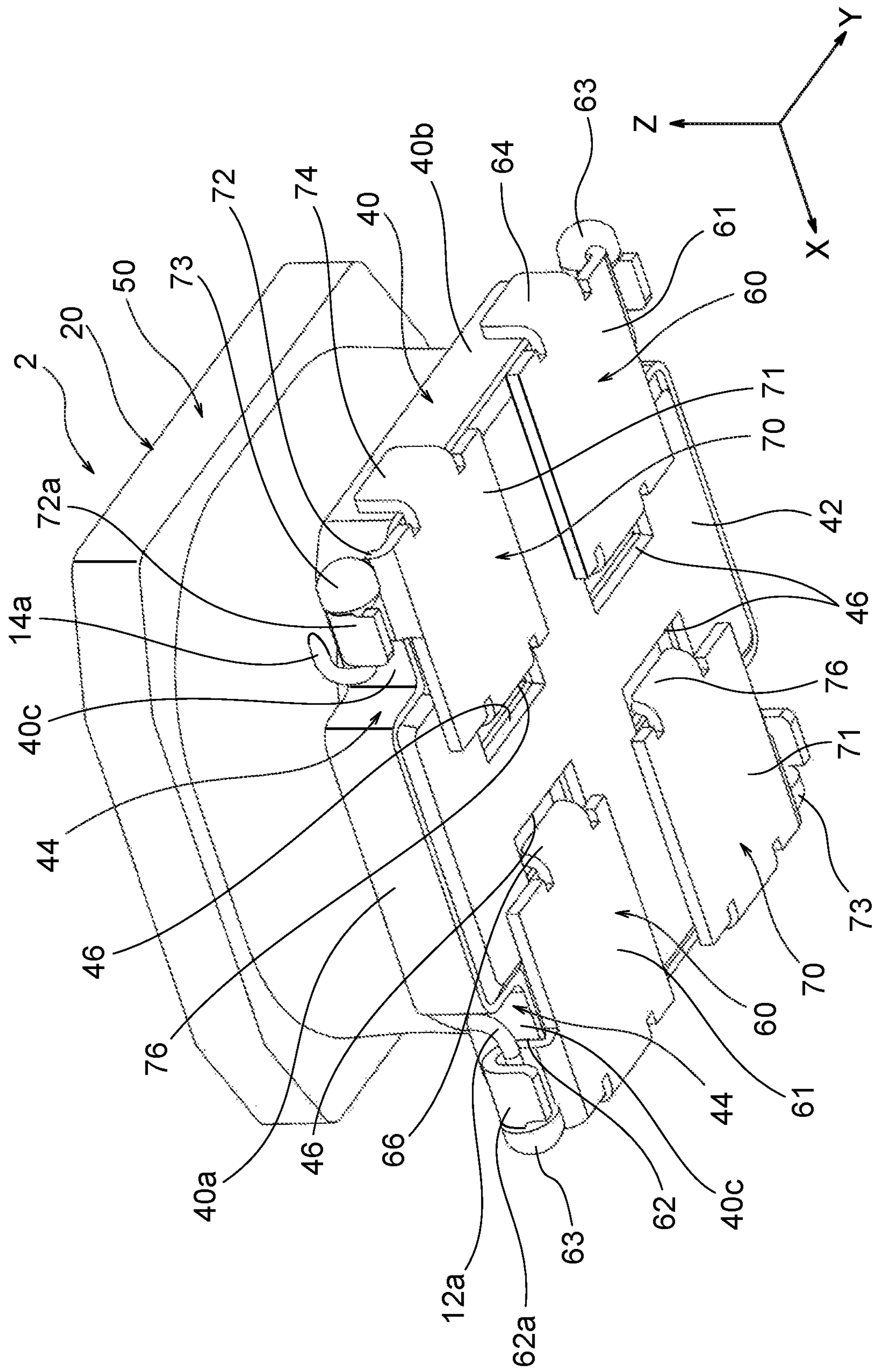
FIG. 1E is a perspective view of the coil device shown in FIG. 1A, as viewed from the bottom surface side.

The terminal electrode 60 and the terminal electrode 70 each have plate-shaped mounting pieces 61, 71 long in the X-axis direction. As shown in FIG. 1E, the mounting pieces 61, 71 are respectively adhered to the outer end surface 42 of the first flange 40 in the winding axis direction by such as an adhesive. A terminal mounting groove that matches the shape of the mounting pieces 61, 71 may be formed on the outer end surface 42 of the first flange 40 to which the mounting pieces 61, 71 are adhered.

Figure 2B:
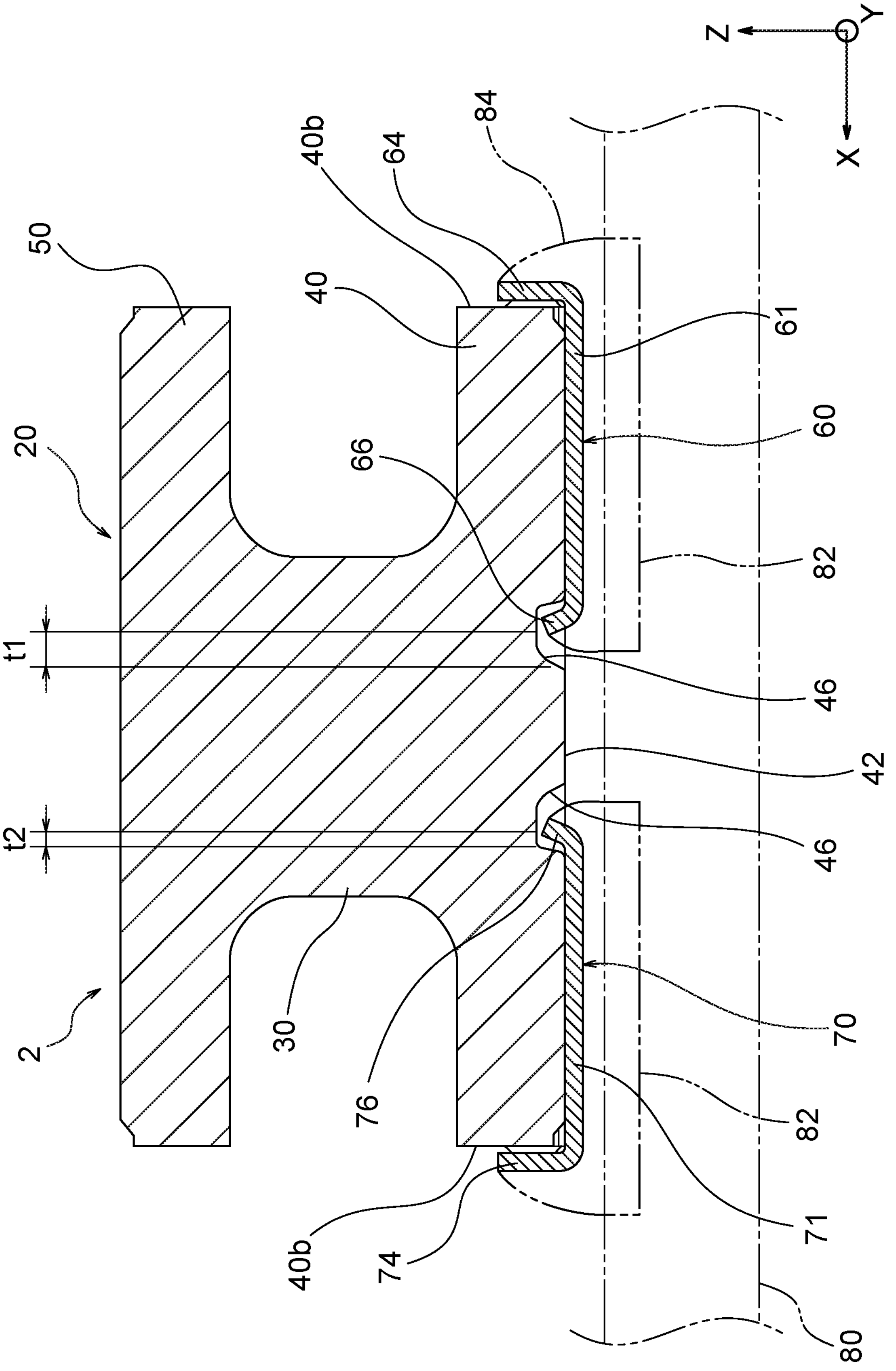
FIG. 2B is a schematic cross-sectional view along line IIB-IIB of the coil device shown in FIG. 1A, in which views of coil and exterior resin are omitted.

The groove depth of the terminal mounting groove is preferably smaller than the respective thicknesses of the mounting pieces 61, 71, and it is preferable that the bottom surface of the mounting pieces 61, 71 protrudes from the outer end surface 42 in the winding axis direction. Therefore, the mounting process when connecting the mounting pieces 61, 71 of the coil device 2 to the wiring pattern 82 of the circuit board 80 or the like as shown in FIG. 2B with a connecting member such as a solder 84 becomes easy.

As shown in FIG. 3, at one end of the mounting pieces 61, 71 in the Y-axis direction, near the outer side in the X-axis direction, rising pieces (the third rising pieces) 62, 72 for wire joint are integrally formed to stand up in the Z-axis direction, respectively. As shown in FIG. 1E, the rising pieces 62, 72 may contact the cutout side surface 40*c* of each cutout 44 of the first flange 40. The cutout side surface 40*c* is a surface drawn from the side surface 40*a* into inside of the cutout 44, and is a surface substantially parallel to the side surface 40*a*.

Figure 4:
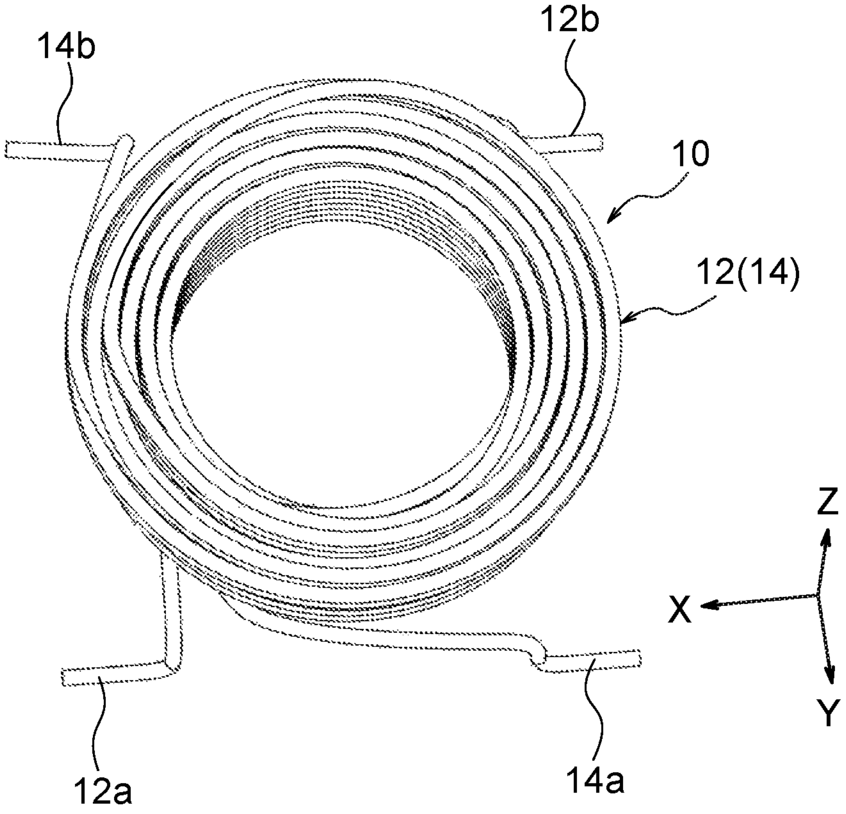
FIG. 4 is a perspective view of the coil shown in FIG. 2A.

The tips of the rising pieces 62, 72 are bent to be folded back to form gripping pieces 62*a*, 72*a*, respectively. Any of the leads 12*a*, 12*b*, 14*a*, 14*b* of the wires 12, 14 shown in FIG. 4 are sandwiched and bonded between the gripping pieces 62*a*, 72*a* and the rising pieces 62, 72, and the wire joints 63, 73 are formed. At the wire joints 63, 73, any of the leads 12*a*, 12*b*, 14*a*, 14*b* and any of the rising pieces 62, 72 of the terminal electrodes 60, 70 are electrically connected.

The wire joints 63, 73 are preferably formed by a laser welding. The laser beam for the welding is irradiated from below the flange 40 along the Z-axis, and the tips of the leads 12*a*, 12*b*, 14*a*, 14*b* are laser-welded to the rising pieces 62, 72, respectively, to form the wire joints 63, 73.

As shown in FIG. 1E, the rising pieces 62, 72, to which the leads 12*a*, 12*b*, 14*a*, 14*b* are respectively attached, are arranged inside each cutout 44 of the first core 40. Moreover, as shown in FIG. 1E, a part of the rising pieces 62, 72 on which the wire joints 63, 73 are formed are arranged at a position corresponding to the chamfer 54 of the second flange 50. Therefore, the laser beam irradiated from below the flange 40 along the Z-axis can form the wire joints 63, 73 without irradiating any of the flanges 40, 50.

As shown in FIG. 3, outer rising pieces (the second rising pieces) 64, 74 are integrally formed at the outer ends of the mounting pieces 61, 71 in the X-axis direction to rise in the Z-axis direction, respectively. The rising height of the outer rising pieces (the second rising pieces) 64, 74 is the same as the rising height of the rising pieces 62, 72 for the wire joint.

Further, at the inner ends of the mounting pieces 61, 71 in the X-axis direction, inner rising pieces (the first rising pieces) 66, 76 are integrally formed to rise in the Z-axis direction, respectively. The rising height of the inner rising pieces (the first rising pieces) 66,76 is smaller than the same of the outer rising pieces 64,74.

Further, the rising angle of the outer rising pieces 64, 74 with respect to the mounting pieces 61, 71 is preferably approximately 90 degrees, similar to the rising pieces 62, 72 for the wire joint. On the other hand, the rising angle of the inner rising piece 66, 76 with respect to the mounting pieces 61, 71 is preferably larger than 90 degrees, preferably 95 to 160 degrees, and more preferably 100 to 150 degrees, as shown in FIG. 2B.

As shown in FIG. 2B, the outer rising pieces 64, 74 are preferably in contact with the side surface 40*b* of the first flange 40, and positioning of each terminal electrode 60, 70 in the X-axis direction with respect to the outer end surface 42 of the first flange 40 is preferably determined. Further, as shown in FIG. 1E, it is preferable that the rising pieces 62, 72 for the wire joint are in contact with the cutout side surface 40*c* inside the cutout 44 of the first flange 40. This is because positioning of each terminal electrode 60, 70 in the Y-axis direction with respect to the outer end surface 42 of the first flange 40 can be determined.

As shown in FIG. 2B, the inner rising pieces 66, 76 loosely enter inside of each independent recess 46 formed on the outer end surface of the first flange 40. That is, it is preferable that each of the inner rising pieces 66, 76 is separated from the inner wall surface of each independent recess 46 by a predetermined clearance (a predetermined gap) t1 along the X axis, and is separated from the outer wall surface of each independent recess 46 by a predetermined clearance (a predetermined gap) t2 along the X axis. Further, it is preferable that each tip of the inner rising pieces 66, 76 is not in contact with the bottom wall surface of each independent recess 46.

Although it is not particularly limited, the predetermined clearance t1 is preferably approximately 1.5 to 5 times the plate thickness of each inner rising piece 66, 76. Further, the predetermined clearance t2 is preferably approximately 0.1 to 3 times the plate thickness of each inner rising pieces 66, 76. The width of each independent recess 46 in the Y-axis direction shown in FIG. 5A is larger than the width of the inner rising pieces 66, 76 in the Y-axis direction shown in FIG. 3, and the width of each independent recess 46 is preferably approximately 1.1 to 1.5 times the width of the inner rising pieces 66, 76.

In this specification of the application, "outer" means a side located in a direction away from the center of the coil device 2, and "inner" means a side close to the center of the coil device 2.

Next, a method of producing the coil device 2 shown in FIGS. 1A to 5A will be described. First, the drum core 20 shown in FIGS. 3 and 5A is formed. The forming method of the drum core 20 is not particularly limited, and compression forming, CIM (ceramic injection molding), MIM (metal injection molding), etc. can be considered. After the forming method, it is fired to obtain a sintered body.

Next, the terminal electrode 60 and the terminal electrode 70 are mounted to the outer end surface 42 of the first flange 40 of the drum core 20. When the terminal electrode 60 and the terminal electrode 70 are mounted and fixed to the outer end surface 42, an adhesive is interposed only between the mounting pieces 61, 71 and the outer end surface 42. Then, it is preferable to be careful not to let the adhesive enter inside of each of the independent recesses 46, and prevent the adhesive from overflow toward the outer side surfaces 40*a*, 40*b*, 40*c* of the first flange.

The terminal electrode 60 and the terminal electrode 70 can be easily formed by punch forming and bend processing a single metal plate, such as a copper plate. After or before mounting the terminal electrodes 60 and 70 to the drum core, the wires 12 and 14 shown in FIG. 4 are wound around the winding core 30 of the drum core 20 shown in FIG. 5 to form the coil 10.

With the coil 10 formed on the winding core 30, the leads 12*a*, 12*b* or 14*a*, 14*b* at both ends of the wires 12, 14 constituting the coil 10 are arranged either between the rising piece 62 for the wire joint and the gripping piece 62*a* of the terminal electrode 60 or between the rising piece 72 for the wire joint and the gripping piece 72*a* of the terminal electrode 70. Laser welding is performed thereto.

As described above, the laser beam irradiated from below the flange 40 along the Z-axis can form the wire joints 63, 73 without irradiating any of the flanges 40, 50. Further, the leads 12*a*, 12*b* (14*a*, 14*b*) of the winding wires 12 (14) and the terminal electrodes 60 (70) are connected, respectively, at a temperature higher than the temperature for forming the solder fillet (230 to 280° C.) such as by laser welding (temperature of 1000° C. or higher). Therefore, a strong and secure wire joint process of the wire 12 (14) is possible.

In the coil device 2 of the embodiment, four terminal electrodes 60, 701 are mounted to the outer end surface 42 of the first flange 40 of the drum core 20 as a magnetic core, as shown in FIG. 1E. Therefore, at least two wires 12, 14 wound around the winding core 30 of the coil device 2 of the embodiment, and each leads 12*a*, 12*b*, 14*a*, 14*b* at both ends of the wires 12, 14 may be connected to each of the terminal electrodes 60, 70. Thus, according to the coil device 2 of the embodiment, it is possible to arrange two coil elements, such as an inductor, in the same device.

Further, in the coil device 2 of the embodiment, four independent recesses 46 are formed on the outer end surface 42 of the first flange 40 of the drum core 20, and the inner rising pieces 66, 76 of the terminal electrodes 60,70 loosely enter the recess 46. Therefore, as shown in FIG. 2B, when the coil device 2 is mounted on a circuit board 80 or the like, a connecting member such as solder 84 enters the inside of the recess 46, and a fillet is formed on the outer surface of the inner rising pieces 66, 76. Thus, bonding strength between the wiring pattern 82 of the circuit board 80 and the terminal electrodes 60, 70 is improved.

The terminal electrodes 60, 70 are composed of such as a metal terminal, and the mounting pieces 61, 71, which is the main part thereof, is adhered to the outer end surface 42 of the flange 40. Moreover, the inner rising pieces 66, 76 of each terminal electrodes 60, 70 only loosely enter each recess 46, and the wall surface of the recess 46 and the inner rising pieces 66, 76 are not engaged. Therefore, even when the coil device 2 is exposed to an environment with severe temperature changes such as from −40 to 150° C., a thermal stress acting on the terminal electrodes 60, 70 is unlikely to act on the flange 40 of the drum core 20. And there is little risk of causing cracks and the like in the drum core 20. Further, the joint strength between the coil device 2 and the circuit board 80 is less deteriorated even in a severe temperature environment.

According to the embodiment, the outer rising pieces 64, 74 are integrally formed on an edge of the mounting pieces 61, 71 located on the opposite side of the inner rising pieces 66, 76 along the X-axis direction. The outer rising pieces 64, 74 are integrally raised along a side surface 40*b* of the flange 40. As shown in FIG. 2B, fillets of such as solder 84 are likely to be formed on the outer surface of the outer rising pieces 64, 74. Therefore, the bonding strength between the terminal electrodes 60, 70 and the circuit board 80 or the like is further improved.

Further, when mounting the coil device 2 on such as the circuit board 80, the solder 84 adhered to the lower surfaces of the terminals 60, 70 also adheres to the outer surfaces of the outer rising pieces 64, 74. Thus, the attachment condition of the solder 84 can be confirmed without being covered by the second flange 50, when viewed from above in the Z-axis direction.

Further, according to the embodiment, the rising heights of the outer rising pieces 64, 74 are lower than the thickness of the first flange 40 in the winding axis direction. With this configuration, the coil device 2 can be made compact. In addition, the exterior resin 15 shown in FIG. 1B is less likely to adhere to the outer rising pieces 64, 74, and does not inhibit the formation of fillets during mounting.

Furthermore, as shown in FIG. 1E, according to the embodiment, the inner rising pieces 66, 76 are arranged offset compared to the outer rising pieces 64, 74, and is located near a center axis of the winding core 30 (See FIG. 2B), when viewed from a direction of the X-axis. By arranging the inner rising pieces 66, 76 as described above, the recess 46, formed on the outer end surface 42 of the flange 40 can be arranged closer to the center side of the outer end surface 42. As a result, the position of the recess 46 formed corresponds to the position of the winding core 30 (See FIG. 2B). And even if the recess 46 is formed on the flange 40, there is less risk of reducing the strength of the drum core 20, and the recesses 46 can be formed without increasing the thickness of the flange 40, which contributes to the compactness of the coil device 2.

According to the embodiment, the rising pieces 62, 72 for the wire joint, different from the outer rising pieces 64, 74, are integrally formed on the mounting pieces 61, 71. The rising pieces 62, 72 for the wire joint are integrally raised along the cutout side surface 40*c* parallel to a side surface 40*a* of the flange 40, and each of the leads 12*a*, 12*b*, 14*a*, 14*b* of the wire is connected to the rising pieces 62, 72 for the wire joint.

With this configuration, each terminal electrodes 60, 70 has three rising pieces 62, 64, 66 (or 72, 74, 76), which are raised at different positions from the mounting pieces 61, 71 to the side surfaces 40*b*, 40*c* or into the recess 46 of the flange 40. As shown in FIG. 2B, the number of fillets, formed by the circuit board 80 and the solder 84, increases. Thus, the connection strength with the circuit board 80 is further improved.

According to the embodiment, the flange 40 protrudes outward in a radial direction of the winding core 30, and has a substantially quadrangular shape when viewed from a direction of the Z-axis, and each of the four corners of the flange 40 has a cutout 44, in which a connection between the rising piece 62 (or 72) for the wire joint and the lead 12*a* (or 12*b*, 14*a*, 14*b*) is arranged.

With this configuration, the volume of the drum core 20 can be maintained maximum and the decrease in inductance can be suppressed without changing the outer diameters of the flanges 40 and 50, while maintaining the compactness of the coil device 2.

That is, according to the embodiment, as shown in FIG. 1A, most of the rising pieces 62,72 for the wire joint of the terminal electrodes 60, 70, including the wire joints 63, 73, fit inside of the cutout 44 of the first flange 40. Moreover, as shown in FIG. 1D, when the outer end surface 52 of the second flange 50 is viewed from the upper side along the Z-axis, only part of the wire joints 63, 73 shown in FIG. 1A can be seen at a position corresponding to the chamfer 54 of the second flange 50. Therefore, the coil device 2 can be made compact, and at the same time, the volume of the magnetic material of the drum core 20 including the flanges 40, 50 can be maximized. Therefore, it is easy to improve the inductance properties of the coil device 2.

Moreover, according to the embodiment, it is possible to minimize the protrusion amount of the terminal metal fittings 60, 70 with respect to the second flange 50 as required, without lowering the inductance and maintaining the size of the flanges 40, 50. Therefore, there is less possibility that the terminal fittings 60, 70 and the lead connection 63, 73 collide with such as the mounting device during the transportation of the coil device 2.

Further, according to the embodiment, the recess 46 is configured so that the adhesive for adhering the mounting pieces 61, 71 to the outer end surface 42 of the flange 40 does not enter. That is, the terminal electrodes 60, 70 are adhered to the outer end surface 42 of the flange 40 only by the mounting pieces 61, 71. With this configuration, even if the coil device 2 is exposed to an environment with severe temperature changes, the thermal stress acting on the terminal electrodes 60, 70 is unlikely to act on the flange 40 of the drum core 20, and there is little risk of causing such as cracks in the drum core 20. Further, even under a severe temperature environment, there is little deterioration in the bonding strength between the coil device and the circuit board.

Further, according to the embodiment, as shown in FIG. 2B, there is an air gap of predetermined clearances t1, t2 between the side wall surface continuous to the bottom wall surface of the recess 46 and the tips of the inner rising pieces 66, 76 entering the recess 46. With this configuration, the thermal stress acting on the terminal electrodes 60, 70 is unlikely to act on the drum core 20 of the flange 40, and there is little risk of causing such as cracks in the drum core 20 even when the coil device 2 is exposed to an environment with severe temperature changes. Further, there is little deterioration in the bonding strength between the coil device 2 and the circuit board 80 even under a severe temperature environment.

Further, the recess is composed of four independent recesses 46 formed on the outer end surface 42 of the flange 40. By making the recess formed on the outer end surface 42 of the flange 40 to be four independent recesses 46, the volume and strength of the drum core 20 are less likely to decrease, and the properties of the coil device 2 can improve and its size can be compact at the same time. Further, with such configuration, it is easy to secure insulation between the terminal electrodes 60, 70.

Figure 5B:
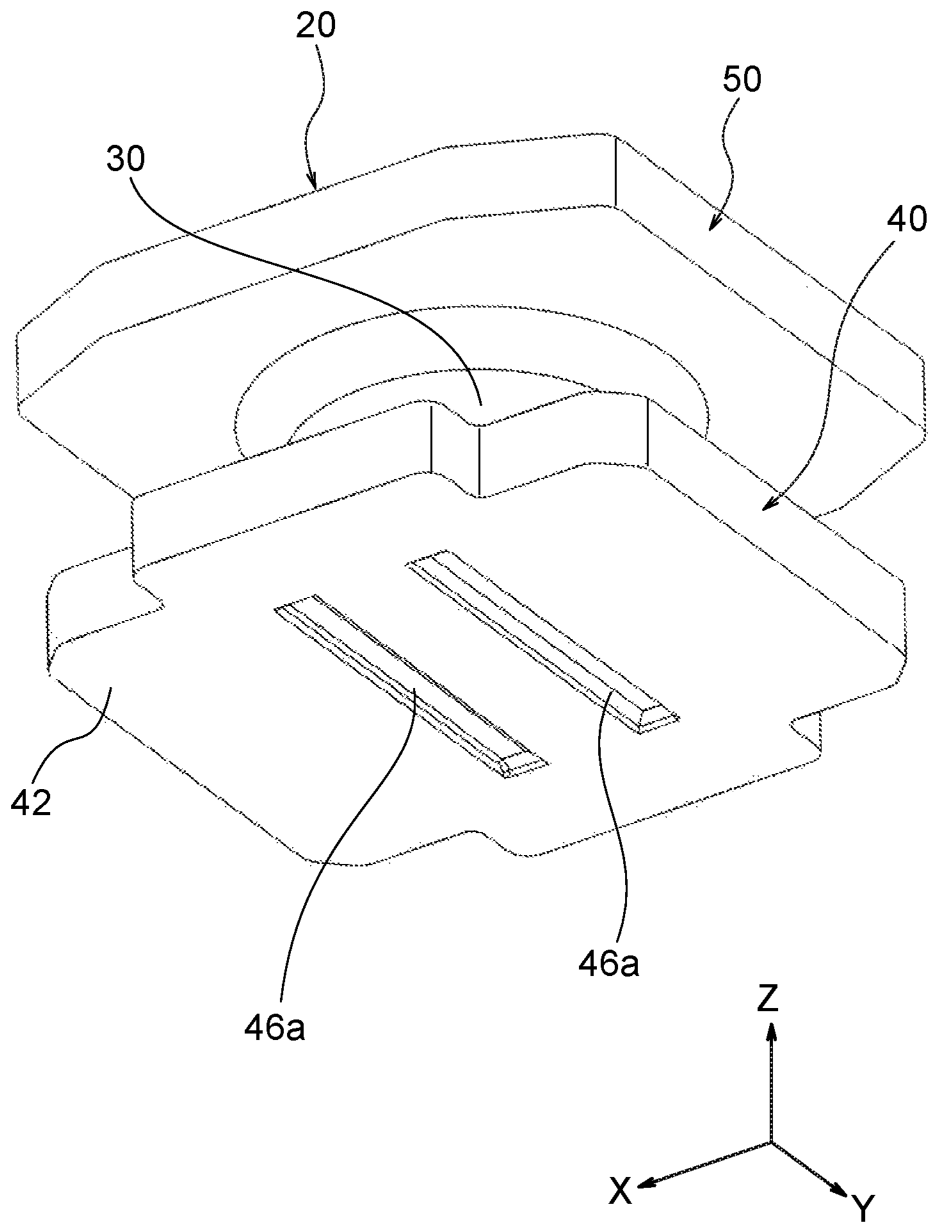
FIG. 5B is a perspective view of the drum core used in the coil device according to the other embodiment of the invention, as viewed from the bottom surface side.
Figure 5C:
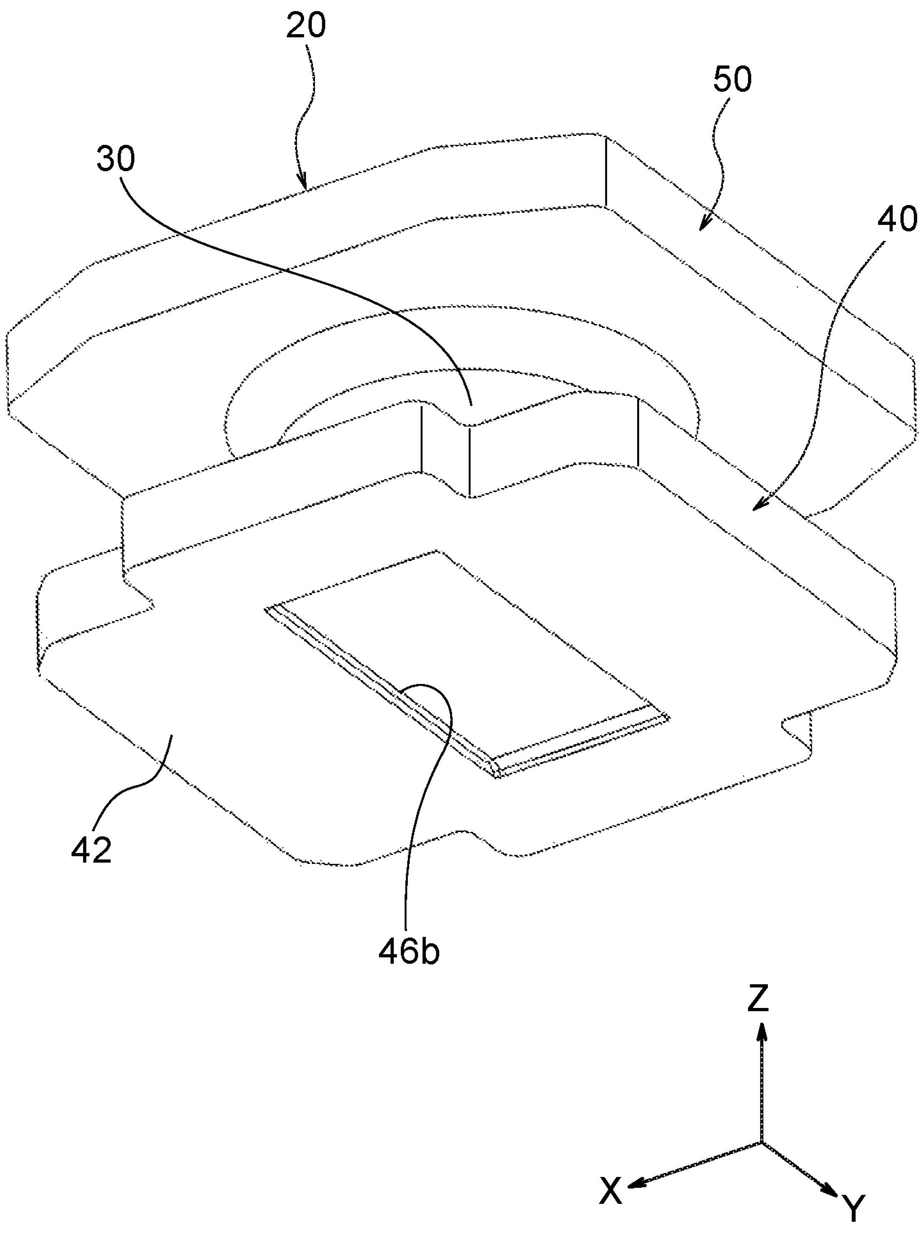
FIG. 5C is a perspective view of the drum core used in the coil device according to another embodiment of the invention, as viewed from the bottom surface side.

According to the embodiment, two independent recesses 46 arranged side by side in the Y-axis direction of the four independent recesses 46 as shown in FIG. 5A may be made continuous, forming two common recesses 46*a* as shown in FIG. 5B. Alternatively, the two common recesses 46*a* arranged side by side in the X-axis direction shown in FIG. 5B may be made continuous to form one common recess 46*b*, as shown in FIG. 5C.

Further, the invention is not limited to the above-described embodiment, and various modifications can be made within the scope of the invention.

For instance, not only laser welding but also thermocompression bonding of 300° C. or more may be used as a means for forming the wire joint 63, 73. Even with thermocompression bonding, the leads 12*a*, 12*b* of the winding wire 12 and the terminal electrodes 60, 70 can be connected at a temperature higher than the temperature (230 to 280° C.) for forming the fillet of the solder 84. Alternatively, as means for forming the other wire joint 63, 73, arc welding, ultrasonic welding and the like are exemplified.

Further, according to the terminal electrodes 60, 70 of the above-described embodiments, it is preferable that no plating film is formed on the inner surfaces of the mounting pieces 61, 71 that contact with the drum core 20 to improve the adhesiveness with the drum core. On the other hand, the outer surfaces, which are the bonding surface with the circuit board, may be tin-plated to improve the bondability with the solder 84.

Further, according to the above-described embodiments, the overall shape of each flange 40, 50 when viewed from the Z-axis direction is a quadrangle, however, it may be a circle, an ellipse, or another shape in the invention.

Furthermore, according to the above-described embodiment, although it is configured that the adhesive for adhering the mounting pieces 61, 71 of the terminal electrodes 60, 70 to not enter the recesses 46, 46*a*, 46*b* formed on the outer end surface of the flange 40, the adhesive may be slightly intruded to the recesses. However, it is preferable that the adhesive does not enter the recesses 46, 46*a*, 46*b* as much as possible from the viewpoint of improving the adhesive force or the bonding strength of the terminal electrodes 60, 70 with respect to the outer end surface 42 of the flange.

EXPLANATION OF REFERENCES

2 . . . Coil device
10 . . . Coil
12, 14 . . . Wire
12*a*, 12*b*, 14*a*, 14*b* . . . Lead
15 . . . Exterior resin
20 . . . Drum core (magnetic core)
30 . . . Winding core
40 . . . First flange
40*a*, 40*b* . . . Side surface
40*c* . . . Cutout side surface
42 . . . Outer end surface
43 . . . Inner surface
44 . . . Cutout
46 . . . Independent recess
46*a*, 46*b* . . . Common recess
50 . . . Second flange
50*a*, 50*b* . . . Side surface
52 . . . Outer end surface
53 . . . Inner surface
54 . . . Chamfer
60 . . . Terminal electrode
61, 71 . . . Mounting piece
62, 72 . . . Rising piece for wire joint (the third rising piece)
62*a*, 72*a* . . . Gripping piece
63, 73 . . . Wire joint
64, 74 . . . Outer rising piece (the second rising piece)
66, 76 . . . Inner rising piece (the first rising piece)
80 . . . Circuit board
82 . . . Wiring pattern
84 . . . Solder

What is claimed is:

1. A coil device comprising:

a magnetic core having a winding core around which a wire is wound to form a coil; and four terminal electrodes attached to an outer end surface of a flange formed at an end of the winding core along a winding axis, wherein a recess is formed on the outer end surface of the flange, each of the terminal electrodes comprises a first rising piece loosely entering the recess, and a mounting piece integrally formed with the first rising piece and adhered to the outer end surface of the flange, a third rising piece, different from the first rising piece, is integrally formed on the mounting piece, the third rising piece is integrally raised along a second side surface substantially perpendicular to a second axis of the flange, a lead of the wire is connected to the third rising piece, the flange protrudes outward in a radial direction of the winding core, and has a substantially quadrangular shape when viewed from a direction of the winding axis, and the flange has four corners, and each of the four corners of the flange has a cutout in which a connection between the third rising piece and the lead is arranged.

2. The coil device according to claim 1, wherein a second rising piece is integrally formed on an edge of the mounting piece located on an opposite side of the first rising piece, and the second rising piece is integrally raised along a first side surface substantially perpendicular to a first axis of the flange.

3. The coil device according to claim 2, wherein the first rising piece is arranged offset compared to the second rising piece and located near a center axis of the winding core, when viewed from a direction of the first axis.

4. The coil device according to claim 1, configured to prevent an adhesive for adhering the mounting piece to the outer end surface of the flange from entering the recess.

5. The coil device according to claim 1, wherein a gap is formed with a predetermined clearance between a side wall of a bottom wall of the recess and a tip of the first rising piece that enters the recess.

6. The coil device according to claim 1, wherein the recess comprises four independent recesses formed on the outer end surface of the flange, and the first rising piece of each of the terminal electrodes is inserted into each of the independent recesses, respectively.

* * * * *